United States Patent [19]

Nishiki et al.

[11] Patent Number: 5,187,584

[45] Date of Patent: Feb. 16, 1993

[54] X-RAY FLUOROSCOPIC APPARATUS USING A SOLID-STATE IMAGING DEVICE

[75] Inventors: Masayuki Nishiki, Ootawara; Yukio Endo, Yokohama, both of Japan

[73] Assignee: Kabushiki Kaisha Toshiba, Kawasaki, Japan

[21] Appl. No.: 497,649

[22] Filed: Mar. 23, 1990

[30] Foreign Application Priority Data

Mar. 29, 1989 [JP] Japan .................. 1-74945

[51] Int. Cl.$^5$ ............................ H04N 5/335
[52] U.S. Cl. ....................... 358/213.18; 358/213.15; 358/213.11; 358/213.22
[58] Field of Search ............. 358/209, 213.18, 213.22, 358/213.25, 213.28, 213.26, 909, 213.19, 111, 167

[56] References Cited

U.S. PATENT DOCUMENTS

| | | | |
|---|---|---|---|
| 4,775,898 | 10/1988 | Akabane et al. | 358/335 |
| 4,835,616 | 5/1989 | Morcom | 358/213.19 |
| 4,839,734 | 6/1989 | Takemura | 358/213.22 |
| 4,866,528 | 9/1989 | Yamazaki et al. | 358/213.22 |
| 4,875,101 | 10/1989 | Endo et al. | 358/213.19 |

OTHER PUBLICATIONS

"Operation and Characteristic of a Clip Imager" by Miyatake et al.

*Primary Examiner*—Herbert Goldstein
*Assistant Examiner*—Tuan V. Ho
*Attorney, Agent, or Firm*—Oblon, Spivak, McClelland, Maier & Neustadt

[57] ABSTRACT

In an X-ray fluoroscopic apparatus including an X-ray tube for radiating an X-ray onto an object to be examined, an image intensifier for converting an X-ray image transmitted through the object into an optical image, a solid-state imaging device having an amorphous silicon layered type charge-coupled device for imaging the optical image through an optical system connected to an output of the image intensifier, and a display for displaying an output image signal from the solid-state imaging device. The solid-state imaging device performs interlaced scanning in a frame storage mode in the odd-numbered field, and in a field storage mode in the even-numbered field.

5 Claims, 4 Drawing Sheets

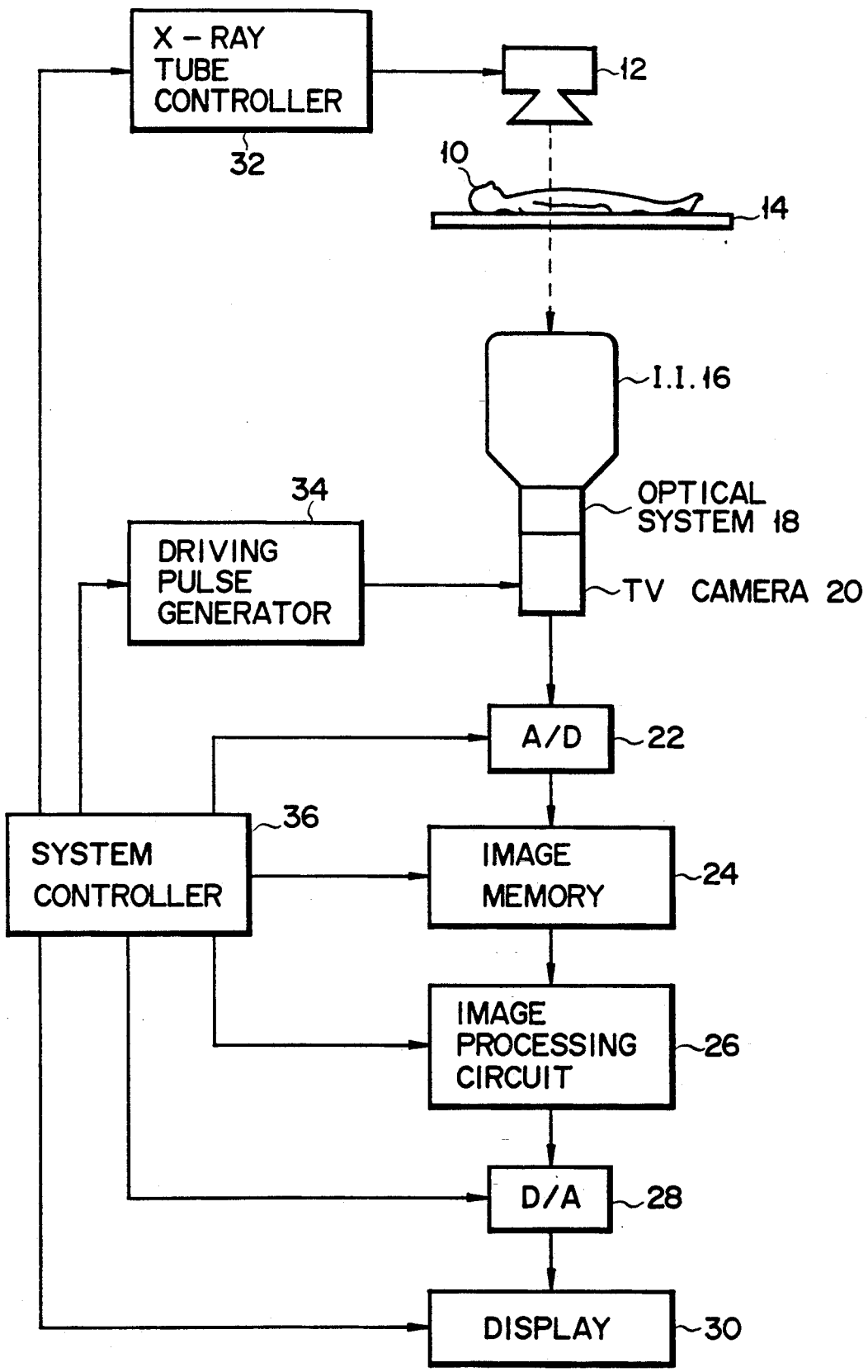
F I G. 1

X-RAY FLUOROSCOPIC APPARATUS USING A SOLID-STATE IMAGING DEVICE

BACKGROUND OF THE INVENTION

1. Field of the Invention

The present invention relates to an X-ray fluoroscopic apparatus and, more particularly, to an X-ray fluoroscopic apparatus using a solid-state imaging device as a TV camera.

2. Description of the Related Art

In a known X-ray fluoroscopic apparatus, an X-ray radiated from an X-ray tube and transmitted through an object to be examined is converted into an optical image by an image intensifier. This optical image is picked up by a TV camera, and is converted into an image signal to display a fluoroscopic image on a monitor. The image signal is converted into a digital signal by an A/D converter, and various kinds of image processing are performed, as needed.

In a conventional TV camera, an interlaced scanning system is employed to respectively scan odd- and even-numbered horizontal scanning lines in odd- and even-numbered fields. In recent years, a solid-state imaging device such as a charge-coupled device (CCD) is often used as a TV camera. The type of the solid-state imaging device is divided into a field storage mode and a frame storage mode with regard to a storing mode of signal charges.

In the field storage mode, each pixel stores signal charges during only a field period. Two pixels adjacent to each other in the vertical direction are read as one pixel, and these two pixels are shifted upward or downward by one pixel in the odd- or even-numbered field. More specifically, two horizontal scanning lines of the imaging device are used as one horizontal scanning line of a TV signal in the field storage mode.

In the frame storage mode, each pixel stores signal charges during a frame period. The charges of the pixels on the odd-numbered horizontal scanning lines are read in the odd-numbered fields, and the charges of the pixels of the even-numbered horizontal scanning lines are read in the even-numbered fields. More specifically, each horizontal scanning line of the imaging device is used as the corresponding horizontal scanning line of a TV signal.

As a result, the vertical resolution in the frame storage mode is twice that in the field storage mode. However, a retained image degrades the quality of the image. Therefore, the usual TV camera includes the solid-state imaging device of the field storing mode.

In the X-ray fluoroscopic apparatus, an X-ray pulse is intermittently radiated. For example, one X-ray pulse is radiated in one frame in synchronism with a frame sync. signal. When a fluoroscopic image is obtained by such radiation of an X-ray pulse, there is no chance to retain the image until the next X-ray pulse is radiated and hence the imaging device is driven in the frame storage mode in many cases.

The frame storage mode in the X-ray fluoroscopic apparatus, however, has the following drawbacks. Pixels on the odd-numbered horizontal scanning lines are first read in synchronism with an X-ray radiation trigger pulse. All the charges in these pixels are read. During reading of a signal in the odd-numbered field, signal charges of pixels on the even-numbered horizontal scanning lines undesirably leak into the pixels on the odd-numbered horizontal scanning lines from which all the charges are read. For this reason, an amount of the signal charges subjected to read from the pixels of the even-numbered horizontal scanning lines is smaller than the actual amount due to the above signal leakage. As a result, an image in the even-numbered field is darker than that in the odd-numbered field. Therefore, when the fluoroscopic image read by such interlaced scanning is displayed on a TV monitor, so-called flickering due to a difference in an amount of the signal between the fields occurs, and it is difficult to observe an image.

Although the CCD type solid-state imaging device has been described above, the above description can be applied to other solid-state imaging devices, such as a MOS type.

SUMMARY OF THE INVENTION

It is an object of the present invention to provide an X-ray fluoroscopic apparatus using a solid-state imaging device which obtains a fluoroscopic image without flickering even if the interlaced reading is performed.

According to the present invention, there is provided an X-ray fluoroscopic apparatus comprising an X-ray source for radiating an X-ray onto an object to be examined, an image intensifier for converting an X-ray image transmitted through the object into an optical image, a TV camera for picking up the optical image obtained by the image intensifier in an interlaced mode, and a driving circuit for operating the TV camera in a frame storage mode during a first field and then in a field storage mode during a next field.

According to the X-ray fluoroscopic apparatus of the present invention, in the first field, charges of every other pixel in the vertical direction are read as a signal of one pixel. In the next field, charged of two pixels adjacent to each other in the vertical direction are read as a signal of one pixel. Therefore, of the charges of the pixels which are not read in the first field, the charge which leaked into the read pixel can be read, thus obtaining a fluoroscopic image without flickering.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate a presently preferred embodiment of the invention and, together with the general description given above and the detailed description of the preferred embodiments given below, serve to explain the principles of the invention.

FIG. 1 is a block diagram of an embodiment of an X-ray fluoroscopic apparatus according to the present invention;

DETAILED DESCRIPTION OF THE PREFERRED EMBODIMENTS

Figure 2:
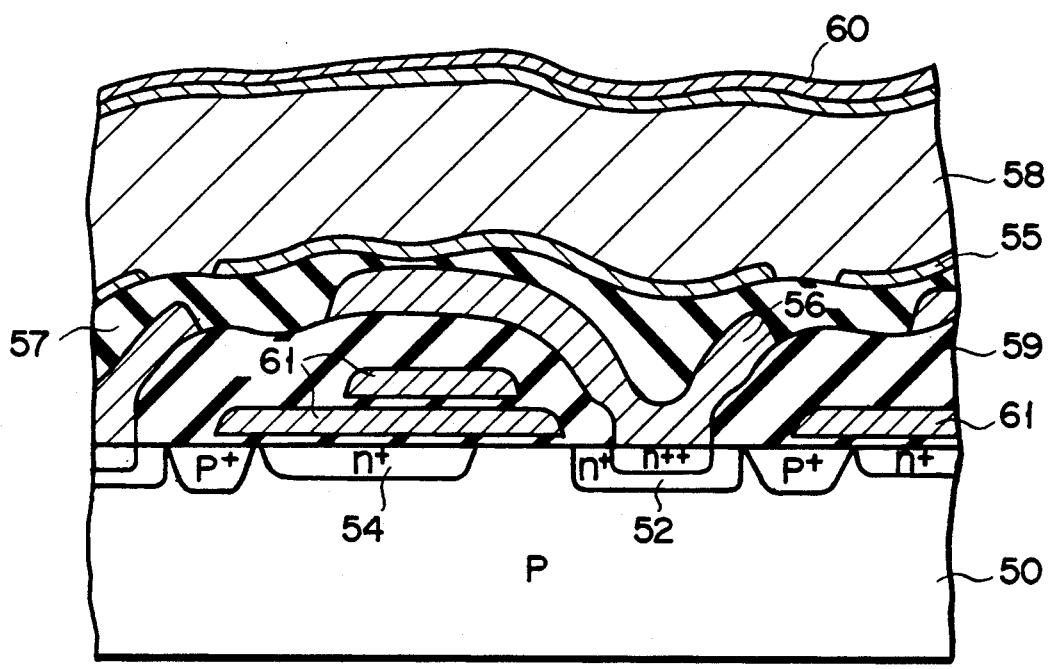
FIG. 2 is a sectional view of an amorphous silicon layered type charge-coupled device used in a TV camera of the embodiment.

An X-ray fluoroscopic apparatus according to an embodiment of the present invention will be described hereinafter with reference to the accompanying drawings. FIG. 1 is a block diagram showing an arrangement of the embodiment. An X-ray tube 12 is disposed above a bed 14 on which an object 10 to be examined is placed, and an X-ray is radiated from the X-ray tube 12 onto the object 10. An image intensifier (I. I.) 16 is arranged below the bed 14 to convert an X-ray image transmitted through the object 10 into an optical image. The optical image representing an X-ray absorbance of tissues in an X-ray irradiated region is output from the image intensifier 16. This optical image is incident on a TV camera 20 through a light-shielding optical system 18 directly coupled to an output of the image intensifier 16. The TV camera 20 outputs an analog image signal representing an X-ray fluoroscopic image of the X-ray irradiated region. Since the output of the image intensifier 16 is coupled to an imaging surface of the TV camera 20 through the optical system 18, the optical image is not incident on the TV camera 20 when an X-ray is not radiated on the object. Though, the X-ray tube 12, the image intensifier 16, the optical system 18, and the TV camera 20 are linearly aligned in the illustrated embodiment, the TV camera 20 may be arranged side of the image intensifier 16 and the optical image may be incident on the TV camera 20 through a mirror for bending light beams. In any cases, the X-ray tube 12, the image intensifier 16, the optical system 18, and the TV camera 20 are arranged to face any direction with respect to the object 10 in order to form a fluoroscopic image from an arbitrary direction.

A solid-state imaging device is used as the TV camera 20. For example, a charge-coupled device (CCD) shown in FIG. 2 can be used. FIG. 2 is a schematic sectional view showing an amorphous silicon layered type CCD solid-state imaging device (photoconductive-layered solid-state imaging device, to be referred to as a PSID hereinafter). An n+-type layer 52 which forms a storage photodiode and an n+-type layer 54 which forms a vertical transfer CCD (shift register) are formed in a surface region of a p-type semiconductor substrate 50. A polycrystal Si layer 61 is formed on the substrate 50 through an SiO$^2$ layer 59. An MoSi layer 56 is connected to the n+-type layer 52. Pixel electrode 55 is formed on the MoSi layer 56 through an insulation layer 57. An I-type amorphous Si layer 58 is formed on the pixel electrode 55, and a transparent conductive layer 60 is deposited on the amorphous Si layer 58. In this PSID, since photoelectric conversion is performed in the amorphous silicon layer 58, an opening degree of a light-receiving section can be set to be 100%, thus realizing a highly sensitive device. On the contrary, however, signal charges easily leak into the adjacent pixels through the amorphous silicon layer 58.

An analog image signal output from the TV camera 20 is converted into a digital image signal by an A/D converter 22. An output from the A/D converter 22 is supplied to an image memory 24. An output from the image memory 24 is supplied to an image processing circuit 26, and an output from the circuit 26 is supplied to a display 30 through a D/A converter 28. An X-ray tube controller 32 is connected to the X-ray tube 12, and a drive pulse generator 34 is connected to the TV camera 20. A system controller 36 is connected to the X-ray tube controller 32, the drive pulse generator 34, the A/D converter 22, the image memory 24, the image processing circuit 26, the D/A converter 28, and the display 30. The system controller 36 includes an operation panel (not shown), and causes the the X-ray tube 12 to radiate an X-ray in response to a control command input using the operation panel. In addition, the system controller 36 drives the TV camera 20 in synchronism with radiation of the X-ray, and controls the A/D converter 22 and the image memory 24 to write a fluoroscopic image signal in the image memory 24. A data read operation from the image memory 24 is also controlled by the system controller 36.

Figure 3:
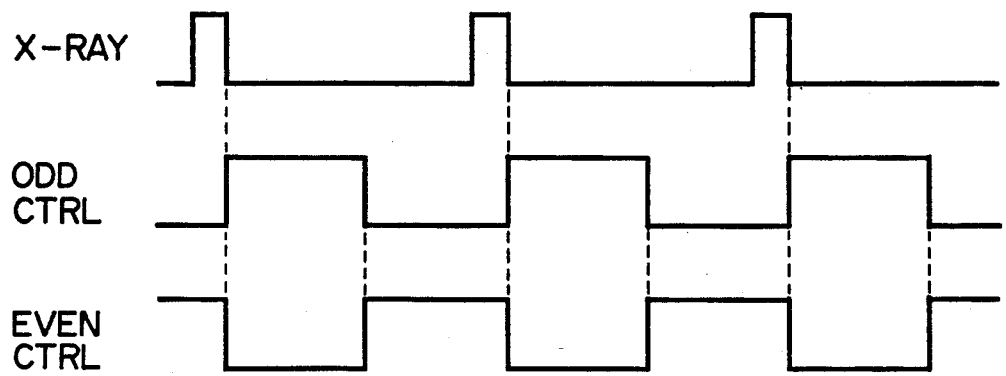
FIG. 3 is a timing chart showing an X-ray radiation timing.

An operation of this embodiment will be described below. As shown in FIG. 3, when an imaging control command is input from the system controller 36, the X-ray tube controller 32 causes the X-ray tube 12 to radiate an X-ray pulse once during one frame period in synchronism with a frame sync. signal (generated in the system controller 36), as shown in FIG. 3. The drive pulse generator 34 for controlling driving of the TV camera 20 supplies read control signals ODD CTRL and EVEN CTRL for odd- and even-numbered fields to the TV camera 20 in synchronism with radiation of the X-ray, i.e., the frame. sync signal.

Upon radiation of the X-ray, a fluoroscopic image (optical image) of the object is output from the image intensifier 16, and is incident on the TV camera 20. In this embodiment, the TV camera 20 can be operated in both the frame storage mode and the field storage mode and the storage mode of the TV camera 20 can be switched in response to the read control signals ODD CTRL and EVEN CTRL.

Figure 4A:
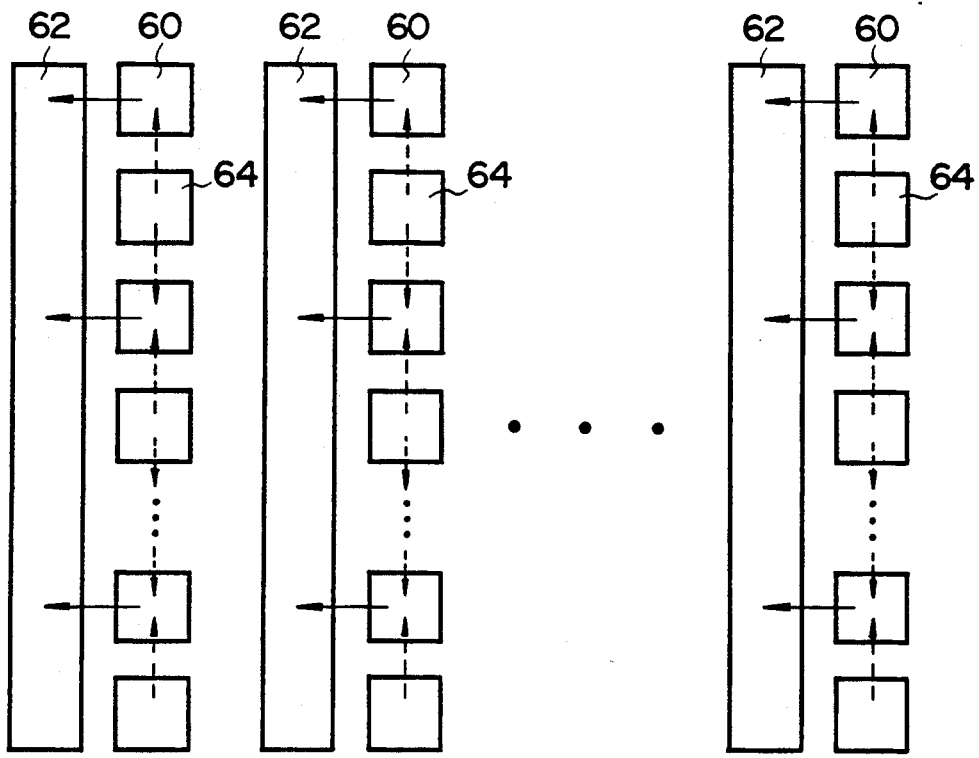
FIGS. 4A and 4B are views for explaining operations of the charge-coupled device in odd- and even-numbered fields, respectively.

In the odd-numbered field, the TV camera 20 is operated in the frame storage mode, as shown in FIG. 4A. The charges in pixels (storage diodes) 60 on the odd-numbered horizontal scanning lines are read, and are transferred to a vertical transfer CCD 62. A signal in each vertical transfer CCD is transferred to a horizontal transfer CCD (not shown). Thereafter, the signal is output from the horizontal transfer CCD. The charges stored in pixels 64 on the even-numbered horizontal scanning lines which are not read during the odd-numbered field may often leak partially into the pixels 60 on the odd-numbered horizontal scanning lines, from which all the charges are read.

Figure 5:
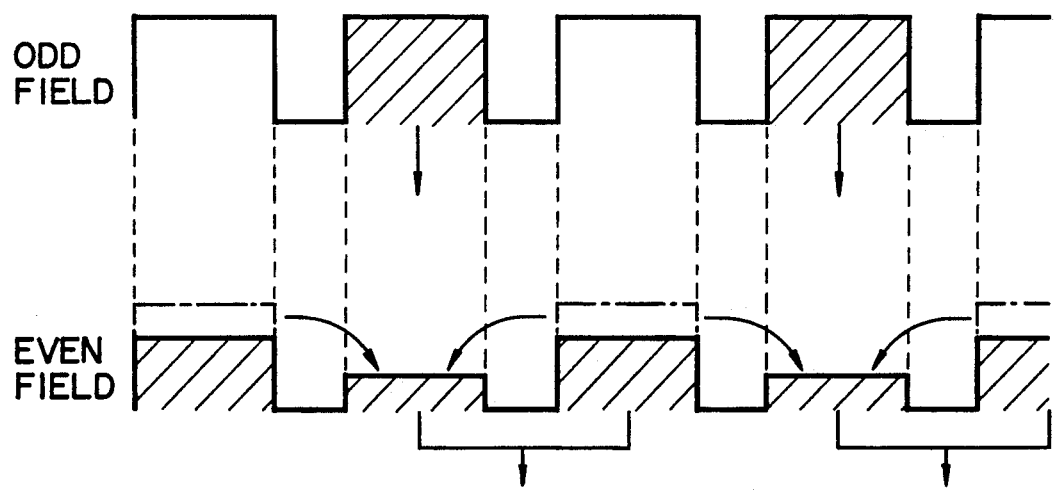
FIG. 5 is a view showing a change in signal charges of a light-receiving section of the CCD to explain an operation of the CCD.
Figure 4B:
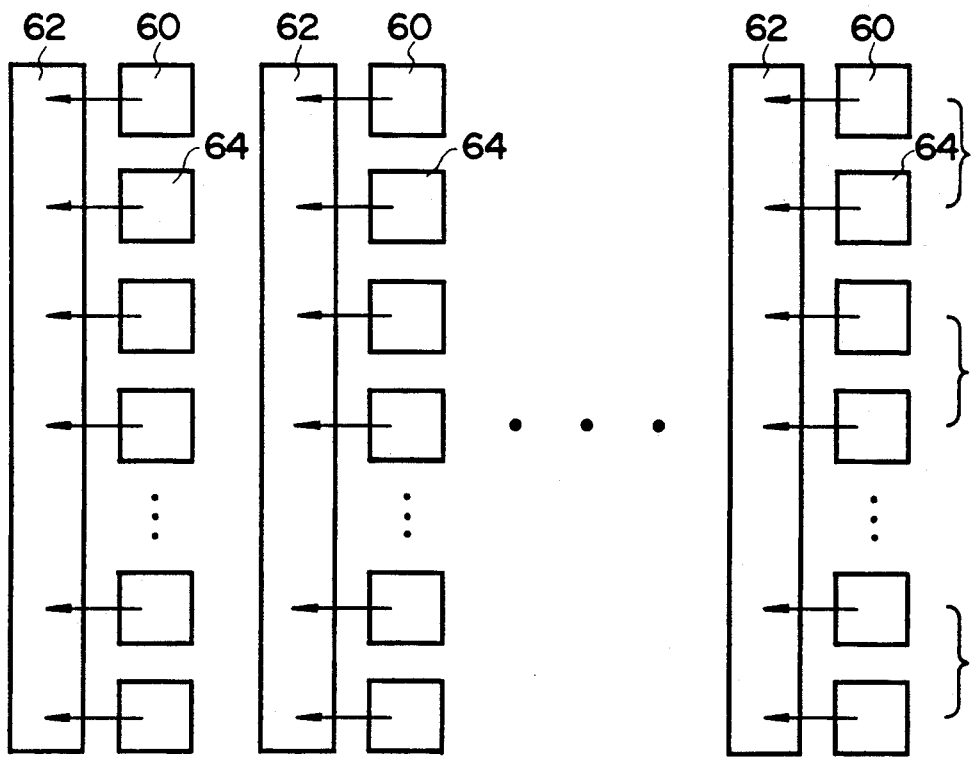

In the subsequent even-numbered field, the TV camera 20 is operated in the field storage mode, as shown in FIG. 4B. All the charges of the pixels are read, and the charges read from the pixels 60 and 64 on the adjacent two horizontal scanning lines are defined as an image signal of the even-numbered horizontal scanning line. Therefore, the charges of the pixels 64 on the even-numbered horizontal scanning lines which leak into the pixels 60 on the odd-numbered horizontal scanning lines, which were empty in the odd-numbered field can be read. A reading operation of the signal charges in the light-receiving section on one (vertical) line in each field is schematically shown in FIG. 5.

As described above, according to the present invention, since an operation is performed in the frame storage mode in the odd-numbered field, vertical resolution is higher than that obtained when the operation is performed in the field storage mode in all the fields. In addition, since the operation is performed in the field storage mode in the even-numbered field, and two pixels are read together as a signal of one horizontal scanning line, the charges which leaked from the nonaccessed pixel into the empty pixel in the preceding odd-numbered field can be read. Even if interlaced scanning is performed in a TV camera using a solid-state imaging device, a variation in signal amount does not occur among the fields, and an X-ray fluoroscopic image without flickering can be obtained.

Note that the present invention is not limited to the above embodiment, and various changes and modifications may be made without departing from the spirit and scope of the invention, as a matter of course. For example, although the PSID has been described above as a solid-state imaging device, another type of CCD, or another type of a solid-state imaging device such as a MOS device can be used. Further, FIG. 3 shows the case in which the X-ray pulses are repeatedly radiated. However, for an X-ray fluoroscopic photograph, it is sufficient to radiate the single X-ray pulse.

As has been described above, according to the present invention, in an X-ray fluoroscopic apparatus using a solid-state imaging device for performing interlaced scanning, frame and field storage modes are switched every field. Therefore, charges which leak from pixels in the frame storage mode can also be read in the field storage mode, and an X-ray fluoroscopic image without flickering can be obtained.

Additional advantages and modifications will readily occur to those skilled in the art. Therefore, the invention in its broader aspects is not limited to the specific details, representative devices, and illustrated examples shown and described herein. Accordingly, various modifications may be made without departing from the sprit or scope of the general inventive concept as defined by the appended claims and their equivalents.

What is claimed is:

1. A solid-state imaging device for performing interlaced reading, comprising:
   light-receiving sections arranged in a two-dimensional matrix;
   a vertical transfer section adjacent to a light-receiving section in each line of the light-receiving sections; and
   means for reading signals in different modes during alternate fields of a frame period, including reading, in an odd-numbered field period, from said light-receiving sections in a frame storage mode, and, reading in an even-numbered field period from the light-receiving sections in a field storage mode.

2. A device according to claim 1, in which said reading means comprises means for reading signals from every other light-receiving section in the vertical direction as a signal of one pixel in the odd-numbered field in the frame storage mode, and reading signals from adjacent two light-receiving sections in the vertical direction as a signal of one pixel in the even-numbered field in the field storage mode.

3. A device according to claim 1, in which said light-receiving sections comprise an amorphous silicon layered type charge-coupled devices.

4. A device according to claim 1, wherein said reading means comprises means for reading signals from light-receiving sections on odd-numbered scanning lines as odd-numbered scanning line signals in the odd-numbered field, and reading signals from light-receiving sections on pairs of the odd-numbered scanning lines and the even-numbered scanning lines as even-numbered scanning line signals in the even-numbered field.

5. A device according to claim 1, wherein said light-receiving section comprises a charge-coupled device.

* * * * *